United States Patent Office 3,037,058
Patented May 29, 1962

3,037,058
2,4,5-TRICHLOROPHENYL-HYDROXYLAMINE
Henry Bluestone, University Heights, Ohio, Paul H. Schuldt, Yonkers, N.Y., and John H. Wotiz, Mentor, Charles E. Entemann, Painesville, and Francis Huba, Fairport Harbor, Ohio, assignors to Diamond Alkali Company, Cleveland, Ohio, a corporation of Delaware
No Drawing. Filed Dec. 2, 1959, Ser. No. 856,654
1 Claim. (Cl. 260—578)

The compounds of this invention have the formula

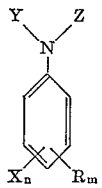

wherein X is chlorine; $n=1$ to 5, inclusive; R is lower alkyl; $m=0$ to 4, inclusive; Y is selected from the group consisting of hydrogen atoms, lower alkyl, acyl and hydroxyl radicals, and Z is selected from the group consisting of hydrogen atoms and lower alkyl radicals.

The preferred chloroanilines can be prepared by reacting chlorosubstituted benzene with sodamide, or other alkali-amide, or by reduction of nitrochlorobenzenes by well-known methods. The chloroanilines may be converted to N-substituted anilines by reaction with acyl halides or anhydrides such as acetic anhydride, or with alkyl sulfates such as dimethyl sulfate. By controlled catalytic hydrogenation of nitrochlorobenzenes, hydroxylamino compounds can be conveniently prepared.

It has been found that the chloroanilines of this invention exhibit a high degree of biological activity and are especially useful as active ingredients in various applications where biological activity is required, particularly as nematocides.

In using the chloroanilines of this invention as nematocides, they can be applied as such or they can be extended with a liquid or solid diluent. The compounds of this invention can, for example, be combined or formulated into suitable compositions for spraying or drenching or, if desired, formulated as an emulsifiable concentrate. Alternatively, the compounds can, of course, be formulated into appropriate use compositions by mixing a toxic amount thereof with a conditioning agent of the kind used and referred to in the art of the pest control adjuvant.

Nematocidal compositions embodying the invention can be prepared in the form of solids or liquids. Solid compositions, preferably in the form of wettable powders, are compounded to give homogeneous free-flowing powder by mixing the active ingredient with finely-divided solids, Attaclays, diatomaceous earth, synthetic fine silica or flours, such as walnut shell, redwood, soybean, cottonseed flour or other solid conditioning agents or carriers of the kind conventionally employed in preparing pest control compositions in solid or liquid form.

Even more preferable among solid compositions, in some instances, are granules or pellets when the application is primarily to the soil. Granules may be prepared by impregnating granular diluents such as granular Attaclay or may be made by first extending powdered solid with powdered diluent and subsequently granulating. Pellets are made by extruding moistened, powdered mixtures under high pressure through dies.

Liquid compositions of the invention can be prepared by mixing the active ingredient with a suitable liquid diluent medium. The resulting composition can be in the form of either a solution or suspension of the active ingredient.

The nematocidal compositions of the invention, whether in the form of solids or liquids, for most applications may also include a surface-active agent of the kind sometimes referred to in the art as a wetting, dispersing or emulsifying agent. These agents, which will be referred to hereinafter more simply as surface-active agents, cause the compositions to be easily dispersed in water to give aqueous sprays.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acrylic hydrocarbons, sodium salt of lignin sulfonic acid (goulac), alkyl naphthalene sodium sulfonate and other wetting, dispersing and emulsifying agents such as those listed in articles by McCutcheon in "Soap and Chemical Specialties," vol. 31, Nos. 7–10 (1955), including, for example, the material known as Triton X-155 (100% alkylaryl polyether alcohol—U.S. Patent No. 2,504,064).

Generally, the surface-active agent will not comprise more than about 5% to 15% by weight of the composition depending, of course, upon the particular surface-active agent, the system in which it is placed, and the result desired; in certain compositions, the percentage will be 1% or less. Usually, the minimum lower concentration will be 0.1%.

The active compound is, of course, applied in an amount sufficient to exert the desired nematocidal action. The amount of the active ingredient present in the compositions as actually applied for killing nematodes will vary with the manner of application, the particular nematodes for which control is sought, the purposes for which the application is being made, and like variables. In general, however, the nematocidal compositions will contain from about 0.5% to 85% by weight of the active ingredient.

Fertilizer materials, herbicidal agents, and other pest control agents such as insecticides and fungicides can be included in the nematocidal compositions of the invention if desired.

In order that those skilled in the art may more completely understand the present invention and the preferred methods by which the same may be carried into effect, the following specific examples are offered:

EXAMPLE 1

*Preparation of 3,4-Dichloroaniline*

91 g. (0.5 mol) of 1,2,4-trichlorobenzene is added dropwise to 500 ml. of liquid ammonia. To this is added 1 mole of lithium amide which has previously been added to 300 ml. of liquid ammonia. A black suspension is formed and the mixture stirred for a period of about 20 hours. The liquid ammonia is evaporated and the residue allowed to warm to room temperature. The mixture is hydrolyzed with 200 ml. of distilled water. The hydrolyzed mixture is extracted with 200 ml. of ethyl ether, and the ether phase separated. The ether is removed by distillation through a fractionating column and the residue is distilled under vacuum, producing solid white crystals which are washed with petroleum ether and dried. The product, M.P. 71–72° C., is identified as 3,4-dichloroaniline by comparison with an authentic sample.

EXAMPLE 2

Preparation of 2,4,5-Trichloroaniline 45.3 g. (0.2 mol) of 2,4,5-trichloronitrobenzene is dissolved in 136 g. (2.26 mol) of glacial acetic acid in a 500 ml., 3-necked flask, equipped with stirrer, thermometer, reflux condenser and addition tube. 45 g. of water is added and the mixture heated to 45° C. 39 g. (0.7 mol) of iron powder is added in small portions with intermittent external cooling to keep the temperature of the reaction mixture below 55° C. during the addition. The mixture is then refluxed with stirring for about 2½ hours. After cooling slightly, the mixture is neutralized by stirring into 181 g. (4.5 mol) of NaOH and ice. The reaction mixture is steam-distilled and the crude product separated from the distillate. The crude product is recrystallized from heptane in the form of white needles and is identified as 2,4,5-trichloroaniline, having a melting point of 94°–95° C., by comparison with an authentic sample.

EXAMPLE 3

Preparation of 2,4,5-Trichlorophenyl-Hydroxylamine 22.6 g. (0.1 mol) of 2,4,5-trichloronitrobenzene dissolved in 100 ml. of isopropyl alcohol is hydrogenated in a Parr low-pressure catalytic hydrogenation apparatus using Raney nickel as catalyst. The hydrogenation is stopped after 2 moles of hydrogen is absorbed. The reaction mixture is boiled with decolorizing carbon and then filtered. From the filtrate, about 12 g. of crude product, melting point 63°–66° C., is obtained. The crude product is recrystallized from 60 ml. of hot heptane to produce 8 g. of pure yellow crystals having a melting point of 65.5° to 66.5° C. Elemental analysis of the purified product indicates its identity as 2,4,5-trichlorophenyl-hydroxylamine, $C_6H_4Cl_3NO$.

| Element | Calculated Percent by Weight for $C_6H_4Cl_3NO$ | Actual Percent by Weight |
|---|---|---|
| C | 33.9 | 33.8 |
| H | 1.9 | 1.45 |
| Cl | 50.0 | 50.0 |
| N | 6.6 | 6.49 |

EXAMPLE 4

In showing the nematocidal activity of the compounds of this invention, composted greenhouse soil in one-half gallon glazed crocks is infested with 3 to 5 g. of knotted or galled tomato roots containing root knot nematodes, Meloidogyne species. Treatment at various rates equivalent to from 512 lbs./acre to 16 lbs./acre in a series of tests (770 mg./crock to 24 mg./crock) is effected by mixing the test chemical intimately with the soil. An indicator crop of three tomatoes are transplated into treated crocks and into infested and non-infested check crocks 4 to 7 days after treatment. The degree of infection which is measured by the number and size of galls formed compared to checks is used as an index of nematocidal activity of the test material. Test results indicating the percent control of the root knot nematode by several compounds of this invention are shown in Table I.

TABLE I

| Experiment No. | Compound | Structure | Preparation | Percent root knot control at lb./acre | | | | |
|---|---|---|---|---|---|---|---|---|
| | | | | 256 | 128 | 64 | 32 | 16 |
| 1 | Salt of 2,4,5-trichloroaniline. | 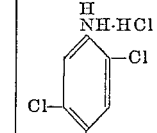 | 2,4,5-trichloronitrobenzene+HCl, zinc catalyst ¹—J. Chem. Soc., 1926, 3041-4 ². | 100 | 50 | | | |
| 2 | 2,4,5-trichloroaniline. | 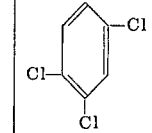 | Example 2 | 100 | 100 | 100 | 90 | 40 |
| 3 | 2,4,5-trichlorophenyl-hydroxylamine. | 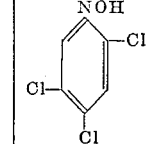 | Example 3 | 100 | 100 | 75 | | |
| 4 | 3,4-dichloroaniline | 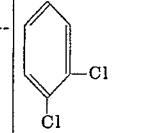 | Example 1 | 100 | 100 | 100 | 87 | 60 |
| 5 | 2-amino-5-chloro-p-xylene. | 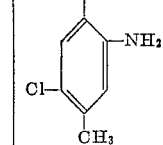 | 2,5-dichloro-p-xylene + sodium amide—Beilstein, 12, II, 617. | 100 | 40 | | | |

TABLE I—Continued

| Experiment No. | Compound | Structure | Preparation | Percent root knot control at lb./acre ||||| 
| | | | | 256 | 128 | 64 | 32 | 16 |
|---|---|---|---|---|---|---|---|---|
| 6 | 2-amino-4-chloro-m-xylene. | (structure: benzene with CH$_3$, NH$_2$, CH$_3$, Cl) | 2,4 - dichloro - m - xylene + sodium amide—Beilstein, 12, I, 486. | 100 | 100 | 20 | | |
| 7 | p-chloroaniline | (structure: benzene with NH$_2$ and Cl para) | Commercial product—Matheson-Coleman-Bell Cat. No. 2949. | 100 | | | | |
| 8 | 2,4,6-trichloroaniline. | (structure: benzene with NH$_2$ and 3 Cl) | Commercial product—Eastman Kodak Cat. No. 1285. | 100 | 50 | | | |
| 9 | o-chloroaniline | (structure: benzene with NH$_2$ and Cl ortho) | Commercial product—Eastman Kodak Cat. No. 578. | 80 | 60 | | | |
| 10 | m-chloroaniline | (structure: benzene with NH$_2$ and Cl meta) | Commercial product—Eastman Kodak Cat. No. P 1271. | 60 | | | | |
| 11 | 2,5-dichloroaniline. | (structure: benzene with NH$_2$ and 2 Cl) | Commercial product—Eastman Kodak Cat. No. 1738. | 100 | 100 | 80 | 7 | 10 |
| 12 | 3,4-dichloroacetanilide. | (structure: benzene with NH-C(=O)-CH$_3$ and 2 Cl) | 3,4 - dichloroaniline + acetic anhydride—Beilstein 16, 626. | 100 | 100 | 90 | 40 | |
| 13 | N-(3,4-dichlorophenyl)-hydroxylamine. | (structure: benzene with NH-OH and 2 Cl) | 1,2-dichloro-4-nitrobenzene+sodium hydrosulfide—Chem. Abstracts, 20, 2152. | 30 | | | | |
| 14 | 3,4-dichloro-N,N-dimethylaniline. | (structure: benzene with N(CH$_3$)$_2$ and 2 Cl) | 3,4-dichloroaniline+dimethyl sulfate—Chem. Abstracts, 48, 6387f (1954). | 100 | | 90 | 22 | |

TABLE I—Continued

| Experiment No. | Compound | Structure | Preparation | Percent root knot control at lb./acre | | | | |
|---|---|---|---|---|---|---|---|---|
| | | | | 256 | 128 | 64 | 32 | 16 |
| 15 | 3,4-dichloro-N-methylaniline. | (structure) | 3',4'-dichloro-N-methyl-p-toluene sulfonanilide+70% $H_2SO_4$—Chem. Abstracts, 48, 10068f British Patent 692,332. | 100 | 93 | 83 | | |
| 16 | 2,4-dichloroaniline | (structure) | Commercial product—Eastman Kodak. | 100 | 100 | 100 | 47 | 15 |
| 17 | dichloroanilines (mixed isomers). | (structure) | Commercial product—Monsanto Chemical Co. | 100 | 100 | 30 | | |

¹ Reactants used.
² Literature reference disclosing at least one method of preparation.

EXAMPLE 5

Using the procedure of Example 4, other related compounds are tested as to their activity against root knot nematodes. The results of these tests are set forth in Table II below.

TABLE II

| Experiment No. | Compound | Structure | Preparation | Percent root knot control at 256 lbs./acre |
|---|---|---|---|---|
| 18 | 4,5-dichloro-2-nitroaniline. | (structure) | 2,4,5-trichloronitrobenzene +ammonia—Beilstein. | 0 |
| 19 | 4-amino-2,5-dichlorophenol. | (structure) | 2,5-dichloro-4-nitrophenol +hydrogen, platinum catalyst—Chem. Abstracts, 23, 3911. | 0 |
| 20 | o-toluidine | (structure) | Commercial product—Fischer Scientific Co. | 0 |
| 21 | 2,4-dichloro-1-naphthylamine. | (structure) | N-(2,4-dichloro-1-naphthyl) acetamide+$H_2SO_4$ Beilstein, 12, 1256. | 0 |

From a comparison of the respective nematocidal activities of the compounds presented in Table I with the nematocidal activities of the compounds of Table II, it is apparent that nematocidal activity of a particular compound is completely unpredictable and cannot be anticipated from the fact that a closely related compound exhibits good nematocidal activity.

It is to be understood that although the invention has been described with specific reference to particular embodiments thereof, it is not to be so limited since changes and alterations therein may be made which are within the full intended scope of this invention as defined by the appended claim.

What is claimed is:

The novel compound 2,4,5-trichlorophenyl-hydroxylamine.

References Cited in the file of this patent

UNITED STATES PATENTS

| | | |
|---|---|---|
| 1,947,926 | Steindorf | Feb. 20, 1934 |
| 2,087,689 | Knecht | July 20, 1937 |
| 2,248,925 | Lincoln | July 15, 1941 |
| 2,257,148 | Ballauf | Sept. 30, 1941 |
| 2,351,247 | Weinmayr | June 13, 1944 |
| 2,370,339 | Wirth | Feb. 27, 1945 |
| 2,384,306 | Hester | Sept. 4, 1945 |
| 2,426,864 | Felton | Sept. 2, 1947 |
| 2,437,527 | Hester | Mar. 9, 1948 |
| 2,536,983 | Owen | Jan. 2, 1951 |
| 2,865,803 | Lewis | Dec. 23, 1958 |
| 2,909,457 | Birum | Oct. 20, 1959 |
| 2,911,340 | Franklin | Nov. 3, 1959 |

OTHER REFERENCES

Chem. Abs. 20, 2152 (1926), 48, 6387 (1954), 48, 10068 (1954), 23, 3911.

Beilstein: 12, II, 617, 12, I, 486, 16, 626.

King: U.S. Dept. Agr. Handbook No. 69, item Nos. 12, 136, 928, 929, 935, pages 25, 49.

UNITED STATES PATENT OFFICE
CERTIFICATE OF CORRECTION

Patent No. 3,037,058                  May 29, 1962

Henry Bluestone et al.

It is hereby certified that error appears in the above numbered patent requiring correction and that the said Letters Patent should read as corrected below.

Column 1, between lines 9 and 10, insert the following as the first paragraph:
    This invention relates to the novel compound 2,4,5-trichlorophenyl-hydroxylamine, to chloroanilines and substituted chloroanilines, their preparation and utilization.
column 2, line 19, for "acrylic" read -- acyclic --.

Signed and sealed this 11th day of September 1962.

(SEAL)
Attest:

ERNEST W. SWIDER
Attesting Officer

DAVID L. LADD
Commissioner of Patents